July 5, 1932.    J. J. MARTIN    1,865,936
CLUTCH CONSTRUCTION
Filed April 29, 1927    2 Sheets-Sheet 1
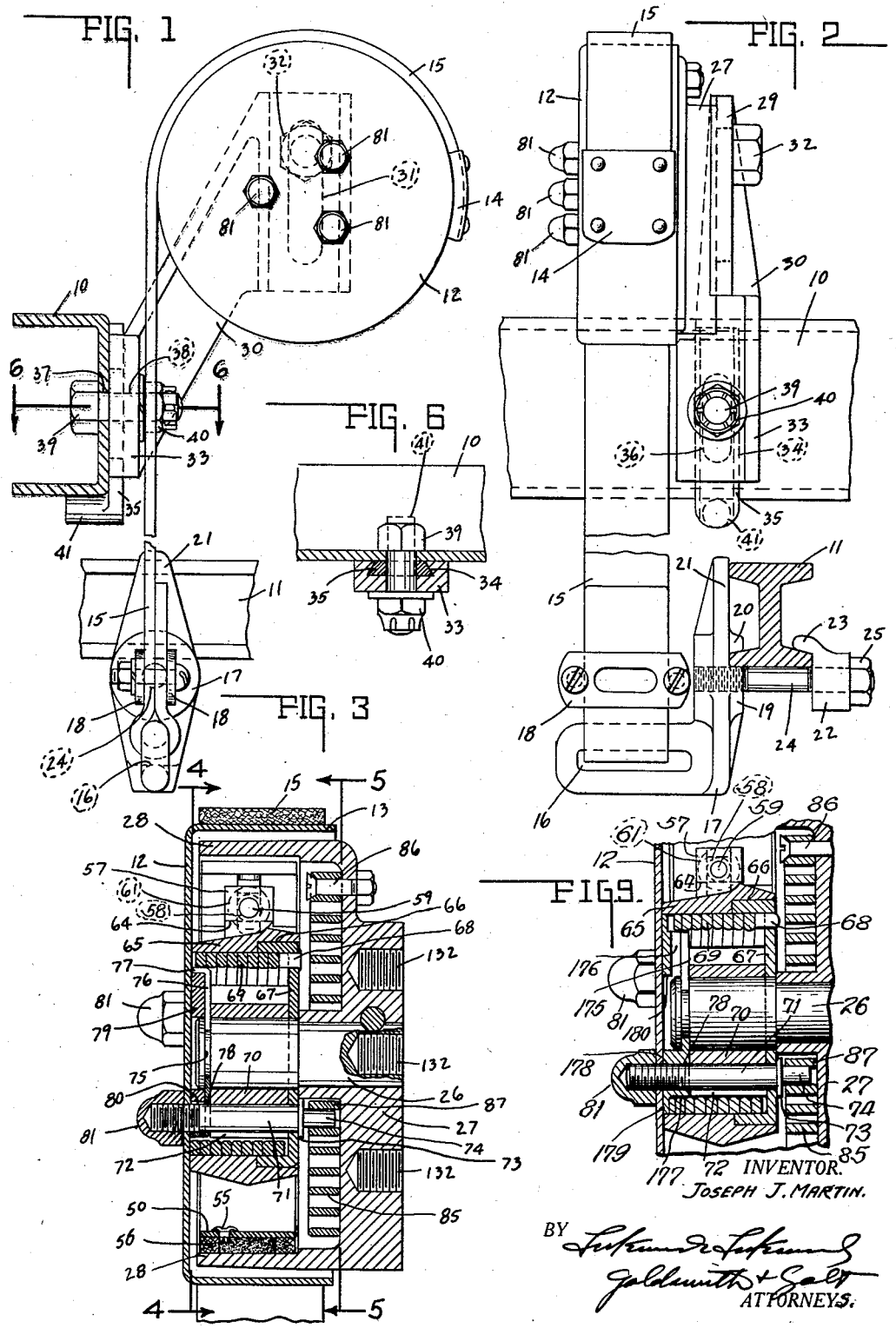
INVENTOR.
JOSEPH J. MARTIN.
BY
ATTORNEYS.

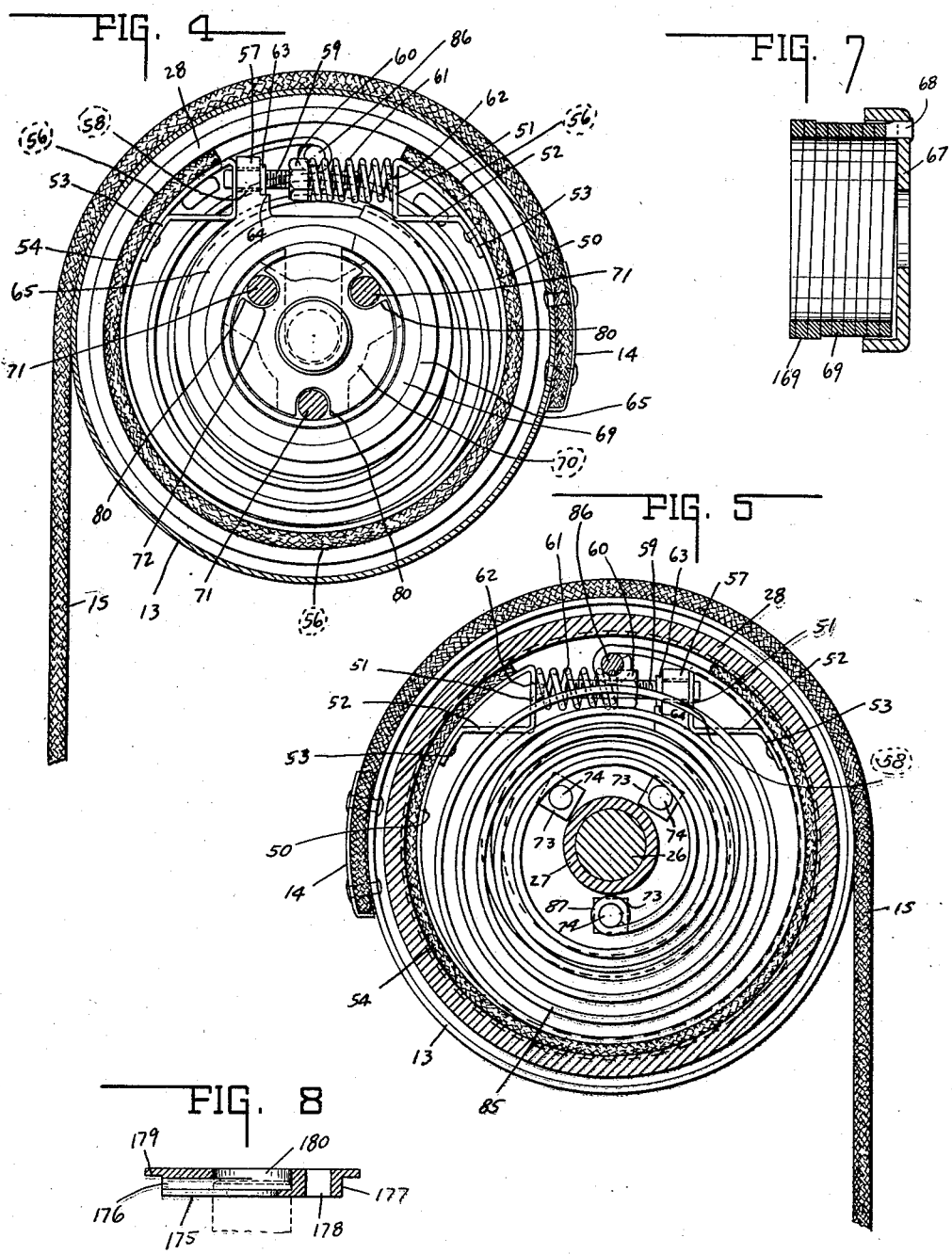

Patented July 5, 1932

1,865,936

UNITED STATES PATENT OFFICE

JOSEPH J. MARTIN, OF NEW CASTLE, INDIANA, ASSIGNOR OF ONE-HALF TO HARRY BURRIS, OF NEW CASTLE, INDIANA

CLUTCH CONSTRUCTION

Application filed April 29, 1927. Serial No. 187,457.

This invention relates to a clutch construction suitable for a shock absorber of the snubber type.

The chief feature of the invention consists in the specific arrangement of the several parts constituting the clutch construction per se, and particularly the incorporation therein of an exteriorally expanding spring which is normally of the over-running clutch type when an adjacent part is rotated in one direction relative thereto and which is expanding or gripping in its action upon said part when relative rotation in the opposite direction obtains.

The full nature of the invention will be understood from the accompanying drawings and the following description and claims.

In the drawings Fig. 1 is a side elevational view of the invention applied to two relatively movable parts of a vehicle, the frame being shown in section. Fig. 2 is a view taken at right angles to Fig. 1 and with the axle in section. Fig. 3 is a central transverse view of the shock absorber. Fig. 4 is an elevational view of the shock absorber with parts removed and in section and is taken on line 4—4 of Fig. 3 in the direction of the arrows. Fig. 5 is a similar view taken from the opposite direction on line 5—5 of Fig. 3. Fig. 6 is a transverse section taken on line 6—6 of Fig. 1 and in the direction of the arrows. Fig. 7 is a lonigtudinal sectional view with the clutch spring and retainer cup removed from the clutch housing. Fig. 8 is a central section of a modified form of locking spacer and spring-centering plate. Fig. 9 is a sectional view of the modification shown in Fig. 8, applied to the structure shown in Fig. 3.

In the drawings 10 indicates a channel or frame member and 11 an axle, the same constituting two relatively movable parts of an automobile chassis. The snubber includes a casing 12 cup-shaped with the cylindrical wall 13 to which is secured as at 14 a strap 15, the same passing through an eye 16 of a bracket or angle member 17 and the end being clamped between a pair of plates 18 to anchor the end of the strap to said bracket.

The bracket 17 includes a shelf portion 19 and another shelf or lug 20 in spaced relation therewith which is adapted to receive the lower flange of axle 11. A vertical extension 21 is adapted to bear on the upper flange of the I-beam axle and thus prevent cocking of the angle bracket 17 when mounted. A clamping member 22 having a clamping or cooperating lug 23 is clampingly associated with the axle for anchoring the bracket 17 thereto by means of the bolt 24 and nut 25.

The casing 12 and 13 encloses a one-way clutch construction, the same being pivotally supported upon a spindle 26 (see Fig. 3) which in turn is stationarily mounted with respect to a base plate 27 having formed integral therewith the drum 28 of a brake connection. The base 27 is secured to the upper and offset portion 29 of a bracket 30, said offset portion including an elongated slot 31 adapted to receive the bolt 32. Said spindle and the base at 132 is provided with openings to receive said bolt for adjusting the position of the bracket 30. Bracket 30 terminates in an anchoring portion 33 having a dove-tailed groove 34 to adjustably receive a fulcrum-forming wedge 35 see Fig. 6, the same including an elongated slot 36 adapted to register with the opening 37 in the chassis channel and the opening 38 in the bracket base, whereby the bolt 39 and nut 40 rigidly but adjustably mount the shock absorber including the clutch construction on the channel, cocking therebetween being prevented by the lateral extension of fulcrum 41 of the slide member 35. With this construction but a single opening is required in the channel and the channel thereby is not weakened as it would be if two or more openings were provided for mounting of the bracket to prevent tilting thereof. The aforesaid bracket construction is adjustable for various depths of frame and by reason of the adjustable arrangement of the anchoring portion 29 relative to the base 27, a single bracket construction is adapted to support the shock absorber upon the chassis for substantially all makes of chassis.

The specific construction of the snubber includes a spring steel band or shoe 50 substantially cylindrical in form but having its adjacent ends turned inwardly at 51 and thence angularly thereof at 52 with an extension 53 lying parallel with the body portion and rigidly anchored thereto. Said spring band or brake shoe carries a brake lining 54 suitably anchored as by riveting and the like (see 55 in Fig. 3) and at suitable intervals and herein three are shown, the band is perforated or recessed to receive a preservative and a scavenging material 56 such as tripoli. The friction material may be of leather and if so preferably the flesh side is out to engage the inner gripping or braking surface of the drum 28. An actuating arm 57 is operable by a one-way clutch construction and bears against one shoulder of the shoe, to wit, 51. Arm 57 is slotted as indicated by the dotted line 58 to receive the bolt 59 slidably supported by the arm 57. Said bolt 59 carries a tension adjusting nut 60 bearing against spring 61 concentric with the bolt and seatable on the opposite shoulder 51 of the shoe, the same having formed therein a spring retainer construction 62. Bolt 59 is prevented from rotating by a squared flange 63 engaging a squared shoulder 64 on the arm 57.

The arm 57 is herein shown formed integral with the clutch collar 65 which has an internal bore of substantially true circular form and of predetermined internal diameter. The bore is increased as at 66 to rotatably mount a spring retainer and anchorage in the form of a cup-shaped member 67, the same having an opening to receive one end 68 of an outwardly expanding, substantially flat coiled spring, the windings being in substantially abuttable relation and the external surface being of predetermined diameter substantially corresponding to that of the clutch collar or slightly more. The end 68 of the spring 69 of the aforesaid connection is preferably welded to the flanged cup 67 and the opposite end of the spring is relatively free. When the cup is rotated in one direction relative to the clutch collar the spring rides free thereof and no connection is obtained, but when the cup-shaped member rotates in the opposite direction the spring expands and engages the clutch collar and inner side wall of the cup and rotates the clutch collar 65 to cause arm 57 to engage the shoulder 51 of the shoe and force the shoe and friction material thereon into engagement with the drum for stopping the relative rotation and thereby securing snubbing action.

A spider member 70 is rotatably mounted on the spindle 26 and is provided with a plurality of parallel openings 72 parallel to the spindle receiving opening to receive the anchoring bolts 71. The spindle 26 is provided with an annular groove 75 and a slotted flanged plate 76 including the flanged portion 77 is slidably receivable by said groove in the spindle. The plate 76 is apertured at 78 to register with the apertures 72 and a spacing washer 79 is similarly relieved as at 80 for like registration, said spacing washer being receivable by the flanged portion 77 and terminating flush therewith. The nuts 81 mounted on bolts 71 clamp the spider 70, plate 76, cup-shaped member 67 and spacing washer 79 to the casing 12 and prevent axial movement thereof relative to the spindle by reason of the seating of the plate 76 in the groove 75. Separation of the several parts is prevented by the bolts 71 bearing on the cup-shaped member 67.

A coil return spring 85 is anchored as at 86 to the base 27 and terminates in an inner eye 87 which receives an extension 74 of one of the bolts 71, see Fig. 3. The extensions of the other bolts 71 assist in centralizing the return spring and the intermediate shoulders or flanges 73 of the several bolts 71 align the spring in addition to the securing of clamping action before-mentioned.

As shown clearly in Figs. 4 and 5, three bolts 71 are provided and they are positioned equidistant from the central axis or lie on the same circle. They, however, intentionally are not arranged in spaced relation but are arranged in eccentric relation to insure predetermined positive positioning of the several parts relative to each other.

The operation is as follows: Upon the vehicle engaging an obstruction such that the channel 10 approaches the axle 11 the return spring 85 through the bolt extension 74 (see Fig. 3), tends to take up the slack in the strap 15 by rotating (see Fig. 1) the casing 12 clockwise. Upon rebound the strap is slowly paid out by the casing gradually rotating in the opposite or counterclockwise direction, (see Fig. 1), such gradual rotation being obtained by the friction engagement of the shoe in the drum and the gripping of the clutch to secure such retardation. The friction shoe supported thereby and clutch collar are rotatable in but one direction, to wit, counterclockwise (see Fig. 4) or clockwise (see Fig. 5). Upon the initial or clockwise rotation of the casing through spring 85, the same being just sufficient to overcome the friction of the parts, the spider, cup spring retainer and spring together with the plate and washer all rotate counterclockwise, (see Figs. 1 and 4) and without in any way actuating the brake shoe or causing rotation thereof relative to the drum, or causing rotation of the clutch collar. Upon reverse movement of the casing by a separation of the two relatively movable chassis parts, the casing, washer, plate, hub and cup together with the spring 69 rotates counterclockwise which throws the exterior peripheral surface of the spring into contact with the bore of the clutch collar and causes the same to grip as the spring tends to unwind and expand radially. Such movement causes counterclockwise rotation of the clutch collar which bears on one end of the shoe band and tends to separate the two ends of the band and force the band into friction enagement.

The resultant action is such that there is a slight slippage before both the clutch spring and the friction band take hold. The result is that the shock absorber is not initially or immediately responsive so that with pneumatic pressure tires oscillations between the relatively movable parts of the vehicle to about two inches are not compensated for in this invention. After about two inches of movement have been obtained in the separating movement of the parts, the shock absorber becomes effective or immediately opposes additional separation and the degree of operation depends upon the strength of the spring and the strength of the gripping action of the band with the shoe. There is a certain slippage that is obtained between these several separable parts which permits a gradual release of the strap by reason of the gradual counterclockwise rotation of the casing. Smoothness of operation is thereby obtained.

In Fig. 7 there is illustrated the preferred form of clutch construction. In this form the retaining cup 67 has secured to it one end 68 of the spring 69. Said spring is reduced in its outside and gripping diameter upon all but two coils and these the extreme coils. Actually the spring is shown substantially full scale. The enlarged or maximum diameter of the coil portion 169 relative to that indicated at 69 is not more than seven thousands of an inch. The purpose of this particular construction is to allow freedom from shock absorbing or snubbing action when driving on smooth roads as heretofore suggested. Thus there is an initial external expansion which engages the first two end coils and as the spring elongates and externally expands throughout the remainder of the spring the gripping or clutching action occurs. Thus there is provision made for initial slippage.

Fig. 8 illustrates an integral type of spring centering and locking and spacing plate. The member is provided with a slot 175 additionally reduced at 176 to pass over and receive the end of the spindle or shaft 26 having the peripheral groove 75 therein. The opening 180 receives said spindle or shaft. The member is also provided with the three-bolt receiving apertures 178 registering with the spider apertures and the flange 179 constitutes a laterally engageable portion engageable by the free end of the spring when it is expanded into clutching action. The annular surface 177 constitutes a spring-centering device. When the spring is in normal position a space of about sixteen thousands of an inch is left between the free end of the spring and the centering locking and spacing plate. Upon engagement of the spring with the clutch collar said spring initially elongates and the free end thereof laterally engages the flange 179 as well as the inside of the clutch collar.

The invention claimed is:

1. In a clutch construction suitable for shock absorbers and the like, the combination of a clutch collar having an enlarged recess at one end and a bore of predetermined diameter at the other end, one being a continuation of the other, a spring retaining cup seated in said recess and having a side wall with an internal diameter substantially that of the bore and an external diameter substantially that of the recess, a clutch spring positionable in the cup and bore and anchored at one end to the former, a rotatably mounted hub rigid with the cup for spacing the same, a spindle mounting said hub and including a peripheral locking groove, a slotted hub-retaining plate receivable by said groove and straddling said spindle and including a peripheral portion positionable within said spring for centering the opposite end thereof, and means securing said plate, hub and cup together for simultaneous rotation.

2. A device as defined by claim 1, characterized by the said means securing the plate cup and hub together extending laterally for closing the end of the collar and the addition of a spacer portion between said plate and said securing means for preventing binding between the clutch collar and securing means.

3. In a clutch construction suitable for shock absorbers and the like, the combination of a peripherally grooved spindle, a spring retaining cup mounted thereon, a spidered hub also mounted thereon, a slotted plate receivable by the spindle groove, and clamping means securing said cup, hub and plate in rigid relation and in predetermined position upon said spindle.

In witness whereof I have hereunto affixed my signature.

JOSEPH J. MARTIN.